United States Patent
Al-Samadi

(10) Patent No.: US 6,461,514 B1
(45) Date of Patent: Oct. 8, 2002

(54) HIGH WATER RECOVERY SINGLE STAGE MEMBRANE PROCESS

(76) Inventor: Riad A. Al-Samadi, 891 Kingsway Drive, Burlington, Ontario (CA), L7T 3H8

( * ) Notice: Subject to any disclaimer, the term of this patent is extended or adjusted under 35 U.S.C. 154(b) by 0 days.

(21) Appl. No.: 09/507,697

(22) Filed: Feb. 22, 2000

Related U.S. Application Data

(63) Continuation of application No. 08/942,438, filed on Oct. 1, 1997, now Pat. No. 6,113,797.

(30) Foreign Application Priority Data

Oct. 1, 1996 (CA) ............................................. 2186963

(51) Int. Cl.⁷ .......................... B01D 61/04; B01D 61/12; B01D 61/10
(52) U.S. Cl. ........................ 210/652; 210/638; 210/641; 210/650; 210/651; 210/660; 210/806; 210/702; 210/723; 210/724; 210/749; 210/805
(58) Field of Search ................................. 210/650, 651, 210/652, 660, 702, 705, 712, 723, 724, 641, 638, 749, 805, 806

(56) References Cited

U.S. PATENT DOCUMENTS

| | | | | |
|---|---|---|---|---|
| 3,799,806 A | * | 3/1974 | Madsen ...................... | 210/641 |
| 4,000,065 A | * | 12/1976 | Ladha et al. ................ | 210/651 |
| 4,083,779 A | * | 4/1978 | Combe et al. .............. | 210/641 |
| 4,775,477 A | * | 10/1988 | Stahl et al. .................. | 210/641 |
| 4,806,244 A | * | 2/1989 | Guilhem ...................... | 210/638 |
| 5,182,023 A | * | 1/1993 | O'Connor et al. ........... | 210/652 |
| 5,338,456 A | * | 8/1994 | Stivers ........................ | 210/652 |
| 5,374,357 A | * | 12/1994 | Comstock et al. .......... | 210/666 |
| 5,501,798 A | * | 3/1996 | Al-Samadi et al. .......... | 210/652 |
| 6,110,375 A | * | 8/2000 | Bacchus et al. ............. | 210/652 |

FOREIGN PATENT DOCUMENTS

| | | | |
|---|---|---|---|
| JP | 53-25280 | * | 5/1982 |
| JP | 57-197085 | * | 5/1982 |

* cited by examiner

*Primary Examiner*—John Kim

(57) ABSTRACT

Disclosed is an economical single stage membrane process intended to provide very high overall water recoveries from natural sources or wastewater containing high concentrations of hardness and other inorganic scale-forming compounds while preventing scale formation on the membrane and prolonging the useful life of the membrane. The water is first pre-treated in order to separate all suspended matter using a suitable oil separation device, dissolved air flotation, coagulation, flocculation, clarification, single or multi-media filtration, ultra-filtration, micro-filtration or a suitable combination of these pre-treatment steps. The pre-treated water is then purified using a simple, economical single stage membrane system operating at a suitable pressure depending on the water TDS and desired permeate recovery. In order to prevent scale formation on the membranes, the membrane concentrate is softened using a "low-cost" ion exchange softening resin with high selectivity for hardness precursors. The softened, suspended solids free, high TDS concentrate is recycled at a sufficient rate and blended with the high-hardness Influent Water in order to provide further, purification, thus achieving the desired high permeate recoveries while preventing scale formation. A small volume of membrane concentrate is bled out of the system in order to control the osmotic pressure.

16 Claims, 4 Drawing Sheets

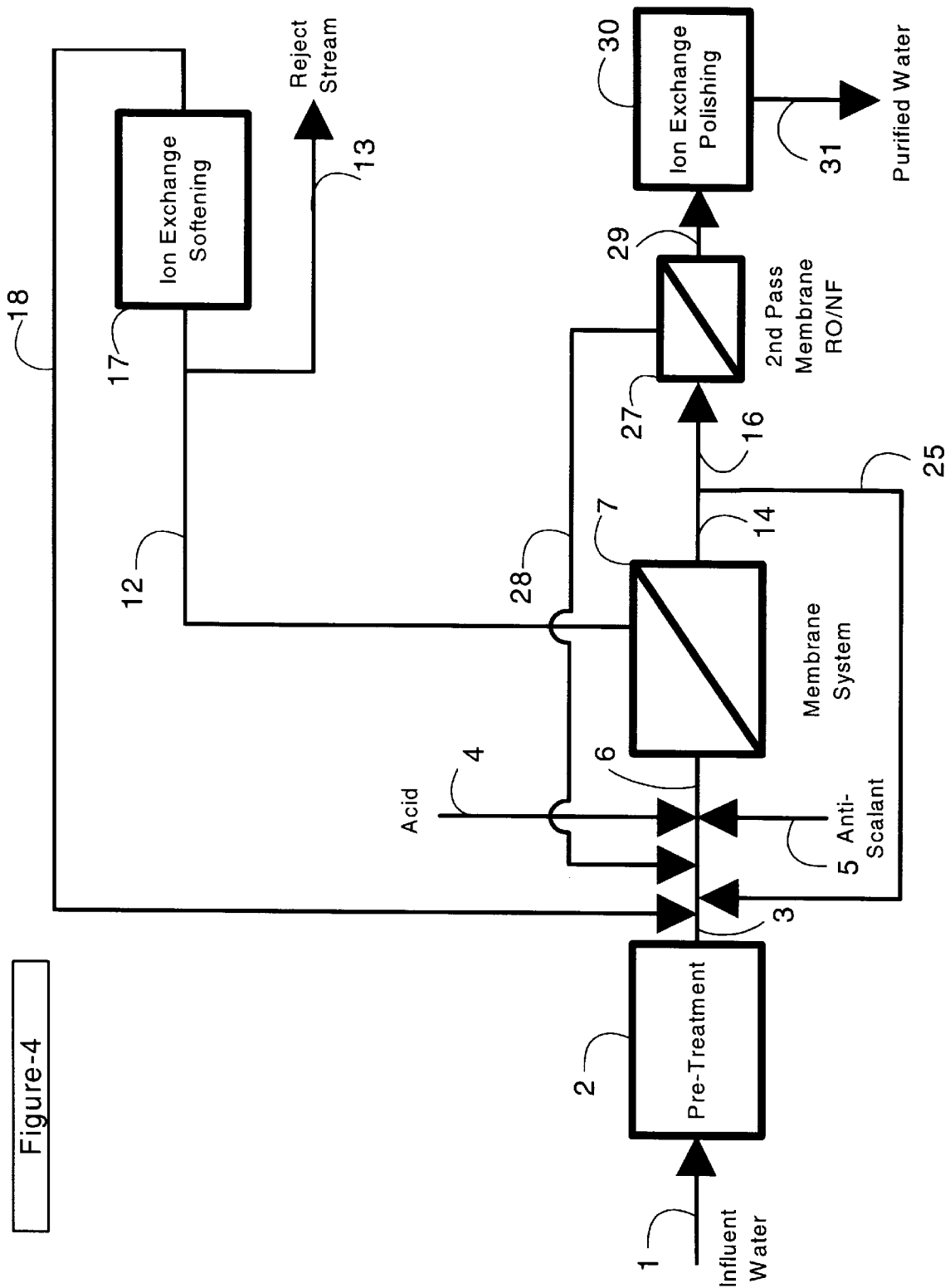

ents and landfill leachates. Water containing hardness compounds is frequently purified by using water softeners and demineralizers in the form of "ion exchange resins, IX", chemical softeners using the cold lime or hot lime softening process, reverse osmosis (RO) membranes, nanofiltration (NF) membranes and/or distillation. Industry needs purified water containing low to very low concentrations of hardness compounds and of soluble inorganic compounds in order to supply their cooling towers, low-pressure and high pressure boilers, heat exchangers and various process uses. On the other hand, the pharmaceutical and electronics industries as well as hospitals and laboratories require high purity water that is almost completely free from inorganic compounds.

HIGH WATER RECOVERY SINGLE STAGE MEMBRANE PROCESS

This application is a continuation of Ser. No. 08/942,438 filed on Oct. 1, 1997 now U.S. Pat. No. 6,113,797.

BACKGROUND OF THE INVENTION

This invention relates to the economical purification of water containing soluble and sparingly or partially soluble inorganic compounds using a single-stage membrane process with a unique recycle of ion exchange "softened" membrane concentrate stream.

Hardness compounds such as barium, calcium, magnesium, iron, silica, carbonate and bi-carbonate, fluoride and sulfate are commonly found in surface water supplies such as lakes and rivers as well as groundwater supplies such as water wells and aquifers and in aqueous industrial effluents and landfill leachates. Water containing hardness compounds is frequently purified by using water softeners and demineralizers in the form of "ion exchange resins, IX", chemical softeners using the cold lime or hot lime softening process, reverse osmosis (RO) membranes, nanofiltration (NF) membranes and/or distillation. Industry needs purified water containing low to very low concentrations of hardness compounds and of soluble inorganic compounds in order to supply their cooling towers, low-pressure and high pressure boilers, heat exchangers and various process uses. On the other hand, the pharmaceutical and electronics industries as well as hospitals and laboratories require high purity water that is almost completely free from inorganic compounds.

The conventional water treatment processes listed above are not suitable because, in the case of DX, the process involves the inefficient transfer of soluble and "sparingly soluble" water impurities to a resin bed which must be regenerated and/or disposed of at high cost. In the case of lime softening, large quantities of chemicals are added and large chemical waste volumes are generated. If conventional RO or NF membranes are used, substantial volumes of RO or NF membrane concentrates will be generated because the permeate recovery (percentage) from these processes is normally limited to approximately 70%–75% and the concentrates must therefore be treated further or disposed of at a large cost. Finally, the very high capital and/or operating costs associated with the direct application of distillation processes normally precludes the use of distillation as a single-step treatment method.

Although membrane filtration processes such as reverse osmosis (RO) and nanofiltration (NF) provide effective and economically viable methods for purifying water, these membrane processes are currently limited in the percentage of purified water produced (known as the permeate recovery or product recovery), by scale formation. Most of the soluble and scale-forming compounds are separated by the membranes and concentrated into a smaller volume, typically 20–30% of the volume of the original water stream. This membrane concentrate volume is normally too large and too costly to dispose of, except in the case of seawater desalination applications where the concentrate stream is returned to sea or where there are no regulatory limits on the concentration of inorganic compounds in the effluent. The main reason why further recovery of purified water from "conventional" RO and NF membranes is not possible is the tendency of inorganic scale such as calcium carbonate and silica to form on the surface of the membranes as the concentration of these compounds is increased beyond their saturation values. Deposition of such compounds frequently results in the loss of purified water production (also known as loss of permeate flux through the membrane) and the eventual need for costly replacement of the membranes.

The use of chemical additives in the water supply such as acids to reduce the pH and inorganic or organic scale inhibitor compounds is practiced in the water treatment arid membrane industry in order to provide some improvement in the water recovery and prevent scale formation. However, such improvement is of limited extent since no scale inhibitor is effective for all the contaminants nor for all permeate recovery ranges and therefore they do not represent an economically viable option for the treatment of the entire water stream.

A survey of prior art shows the following patents:

U.S. Pat. No. 4,000,065 discloses the use of a combination of reverse osmosis (RO) and ultrafiltration (UF) to separate organic material from the aqueous stream. The contaminated aqueous stream is circulated from the high pressure compartment of an RO unit to the high pressure compartment of a UF unit, then to the low pressure compartment of the UF unit and then back to the high pressure compartment of the RO unit.

Japanese Patent 57-197085 discloses a filtration apparatus that comprises connecting UF apparatus and RO apparatus in series so as not to deposit scale on the RO membrane.

U.S. Pat. No. 3,799,806 discloses purification of sugar juices by repeated ultrafiltration and reverse osmosis purification steps.

U.S. Pat. No. 4,083, 779 discloses a process for treatment of anthocyanate extract by ultrafiltration and reverse osmosis treatments.

U.S. Pat. No. 4,775,477 discloses a process for extraction of cranberry presscake wherein the presscake is ground and subjected to microfiltration to remove colloidal high molecular weight compounds followed by reverse osmosis to recover a red-colored solution.

U.S. Pat. No. 5,182,023 discloses a process for removing arsenic from water wherein the water is first filtered to remove solids then passed through an ultrafilter, followed by a chemical treatment to adjust pH to a range from about 6 to 8. Thereafter, scale-inhibitors and anti-fouling materials are added before subjecting the water to reverse osmosis to provide a stream having less than about 50 ppb of arsenic.

Japanese Patent 53025-280 discloses the separation of inorganic and organic compounds from a liquid by first using a reverse osmosis membrane and then using a second reverse osmosis membrane having a more permeable membrane such as a microporous or ultrafiltration membrane. Part of the contaminated liquid obtained from the first membrane is processed through the second membrane.

U.S. Pat. No. 5,501,798 discloses a high recovery water purification process involving the use of reverse osmosis followed by chemical precipitation of hardness compounds from the RO concentrate followed by microfiltration to separate precipitated solids and recycling of the "suspended solids' free concentrate" back to the RO.

The above-referenced patents and other available literature have aimed at preventing precipitation of inorganic scale and other membrane fouling compounds as the water is treated by reverse osmosis membranes. As the concentration of scale and other inorganic and organic fouling compounds build up on the surface of the RO membranes, the purified water permeation rate deteriorates with eventual irreversible loss of productivity and need for costly membrane replacement. Prior art teaches acidification (i.e. pH reduction) as a means of reducing the potential of calcium carbonate scale formation. Prior art also teaches the addition of scale inhibitors such as polyacrylic acids and sequestering agents such as ethylene diamine tetracetic acid (EDTA) and sodium hexametaphosphate (SHMP) in order to reduce the scale formation potential due to barium sulfate, calcium fluoride, calcium and magnesium carbonate and sulfate and silica. However, these scale inhibitor compounds are not sufficiently efficient to allow very high water recoveries and concentration factors to be achieved. Maximum recoveries in the presence of scale inhibitors may be in the range 70%–75%, based on the treatment of hard "well-water". The above-referenced patents also teach the separation of suspended solids existing originally in natural water sources and industrial effluents or the separation of chemically-precipitated compounds using ultrafiltration or microfiltration before reverse osmosis treatment. While removal of suspended solids by membrane filtration will prevent fouling of the RO membranes, it does not prevent concentration and eventual deposition of the initially soluble scale compounds, as the recovery of purified water is increased using RO. U.S. Pat. No. 5,501,798 teaches a high recovery process involving the use of a single stage reverse osmosis system, chemical precipitation and microfiltration (MF) and recycling of MF permeate to the RO membrane system to maximize the recovery of purified water, However, high water recovery from the process of U.S. Pat. No. 5,501,798 is limited by the maximum RO membrane system operating pressure of 1,000 psig. The process of U.S. Pat. No. 5,501,798 also has the inherent disadvantage of high capital and operating cost associated with the chemical precipitation step and the suspended solids separation step. The suspended solids in the supernatant from the precipitation step are separated by microfiltration membranes or other separation means and the softened MF membrane permeate or filtrate is recycled to the RO membranes in order to minimize the scale formation potential on these membrane.

Therefore, there is need for an improved, simple, economical, single-stage process for the purification of small flowrates of water (i.e. 5–50 U.S. gallons/minute., gpm), which provides high water recoveries, in the range 67%–99.9%, while preventing formation of scale on the RO or nanofiltration (NF) membrane surfaces, and thus prolonging the useful life of these membranes.

SUMMARY OF THE INVENTION

It is an object of the invention to provide an improved process for the treatment of small flowrates of water from natural sources or wastewater containing soluble and partially or "sparingly soluble" inorganic scale-forming compounds.

It is another object of the invention to provide an improved process using a simple, single stage membrane system to purify water containing soluble and sparingly soluble inorganic compounds.

It is still another object of the invention to provide an improved process using a single-stage membrane system to purify water containing soluble and sparingly soluble inorganic compounds wherein 67%–99.9% of the water can be recovered as purified water without incurring the risk of scale deposition which reduces the useful life of the membrane.

Yet, it is another object of the invention to provide an improved process using a single-stage membrane system to purify water containing soluble and sparingly soluble inorganic compounds wherein 67%–99.9% of the water can be recovered as purified water without incurring the risk of scale deposition and wherein the concentrate (also known as retentate) is softened and recycled for further processing using a suitable, low-cost ion exchange water softening resin to remove the cationic scale precursors.

These and other objects of this invention will become clear from the specification, claims and drawings appended hereto.

In accordance with these objects, there is provided an improved, simple, single stage economical membrane process for the treatment of small flowrates of water from natural sources or wastewater containing partially or "sparingly soluble" inorganic scale-forming compounds wherein very high permeate recoveries in the range 67%–99.9% are achieved. The water containing the inorganic scale-forming compounds as well as completely soluble inorganic compounds is first pre-treated in order to separate virtually all the suspended matter including oil and grease by using an oil separation device followed by chemical coagulation, flocculation, clarification and/or gravity settling, and multi-media filtration. Alternatively, the water is pre-filtered using micro-filtration or ultra-filtration to effectively separate all suspended solids and colloidal matter. If iron is also present in the water, the water must be aerated using appropriate in-tank air spargers before coagulation, flocculation and/or filtration. The pre-treated water in the present invention is purified by the single stage membrane system operating at a suitable pressure depending on the concentration of soluble compounds and the desired permeate recovery. In order to prevent formation of scale compounds on the membranes, the concentrate (also known as retentate) is softened using a suitable, low-cost ion exchange (IX) water softening resin to remove the cationic scale precursors. The softened concentrate will contain a high concentration of soluble ions, also known as the total dissolved solids (TDS). The softened membrane concentrate is recycled and blended with the influent water stream to undergo further purification. A small volume of concentrate is removed from the system upstream from the IX water softening resin and disposed of as a reject stream in order to control the membrane's osmotic pressure and the permeate recovery. By using an efficient IX water softening resin in lieu of chemical precipitation of hardness compounds, formation of precipitated solids which is encountered in the prior art is avoided, thereby simplifying the post-treatment of the membrane concentrate and reducing the overall complexity as well as the capital and operating costs of the process.

BRIEF DESCRIPTION OF THE DRAWINGS

In the drawings which illustrate embodiments of the invention, FIG. 1 (FIG. 1) is a schematic representation of the proposed economical high recovery single stage membrane process for the purification of small flowrates of raw water 1 containing low to moderate Total Dissolved Solids (TDS) with moderate to high hardness, where a good quality of treated water 16 is required with a minimum reject volume 13.

FIG. 4 is a schematic representation of yet another economical enhanced recovery single stage membrane process for the production of extra high purity water 31 which involves recycling of the membrane concentrate 12 via an IX softening resin 17 in order to prevent scale formation on the membrane 7, recycling of the permeate 25 to improve the water quality and using a second pass membrane 27 to obtain very high water quality, as described in the embodiment of FIG. 3. In this case, however, the high purity second pass membrane permeate 21), is purified further by using a polishing mixed-bed ion exchange resin 30, in order to provide purified water 31, having extra high purity.

DETAILED DESCRIPTION OF THE PREFERRED EMBODIMENTS

Figure 1:
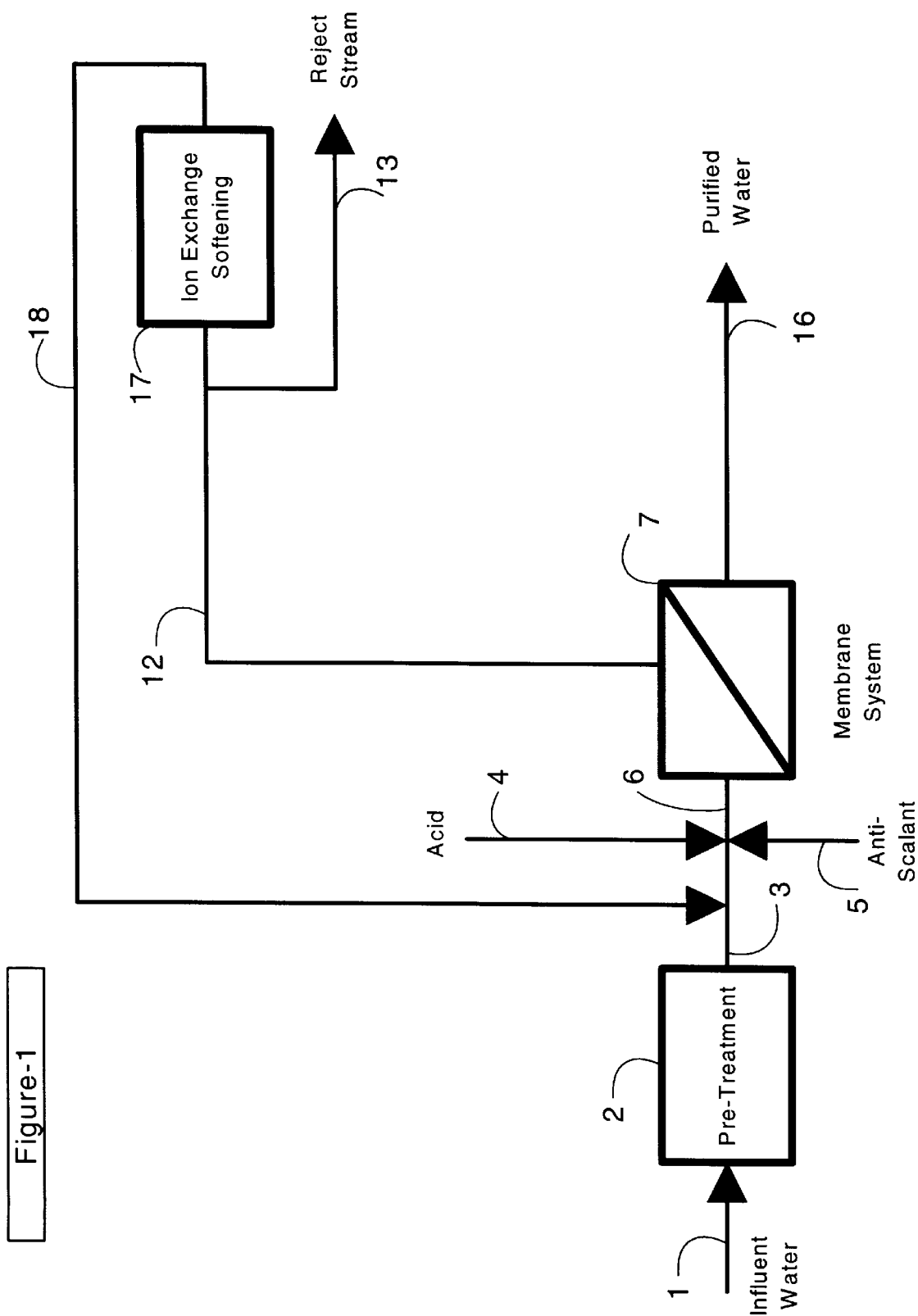
FIG. 1 shows a raw water pretreatment step 2 intended to remove suspended matter by using suitable pretreatment means including coagulation, flocculation, clarification, multi-media filtration, ultrafiltration or microfiltration. Pretreatment is followed by a single stage reverse osmosis (RO) or nanofiltration (NF) membrane system 7, where the pre-treated water is pressurized and introduced into the high pressure side of said RO or NF membranes and a very large portion of the water is purified, providing a purified water (i.e. membrane permeate) stream 16. In order to prevent scale formation on the surface of the membranes, an efficient ion exchange (IX) water softening resin 17 is used to treat the RO or NF membrane concentrate stream 12, thereby removing the water hardness and providing a softened membrane concentrate stream 18. The said softened membrane concentrate stream 18 is recycled and blended with the pre-treated hardness-containing raw water (i.e. stream 3) before introducing the blended stream 6 to the membrane system 7.

When using a semi-permeable membrane such as reverse osmosis (RO) or nanofiltration (NF) to purify water, the soluble inorganic ions such as sodium, potassium, calcium, magnesium, iron, chloride, fluoride, carbonate, bicarbonate, sulfate and silica are separated by the membrane while the water is allowed to permeate or pass through the membrane. While RO membranes separate all inorganic (and indeed organic) species, NF membranes are somewhat "looser" than RO membranes and have selectivity for separation of divalent and other multivalent ions such as carbonate, phosphate, silicate, sulfate, aluminum, barium, calcium, magnesium, strontium, chromium, copper, lead, nickel, silver, tin, titanium, vanadium, zinc and other multivalent cations of the periodic table, while allowing monovalent ions such as sodium, potassium, cesium, chloride, fluoride, nitrate and other monovalent ions to permeate through the membrane. NF membranes are therefore typically used to remove "hardness" and other sparingly soluble compounds from the water (i.e. calcium, magnesium, silica, etc.). Typically, the water solubility of these hardness ions, when combined with certain monovalent, divalent or multivalent anions such as fluoride, carbonate, hydroxide, phosphate and sulfate (e.g. calcium fluoride, calcium or magnesium carbonate, calcium or magnesium silicate and calcium sulfate) is rather low when compared to compounds of monovalent cations such as sodium chloride, sodium carbonate or sodium sulfate. These compounds of multivalent cations are therefore termed "sparingly soluble compounds" and such term will be used extensively in the present invention.

As soluble and "sparingly soluble" ions are separated (or "rejected", by a semi-permeable membrane, the concentration of these compounds in solution increases and the osmotic pressure of the solution also increases. The solution must therefore be subjected to an operating pressure higher than the osmotic pressure of the solution in order to continue to permeate purified water through the membrane while the membrane retains, separates or rejects the soluble compounds (and indeed any water-borne insoluble suspended solids). The purified water recovery, also known as permeate recovery or "product" recovery, is the fraction of the total "raw water" (or "influent water") flowrate that has been permeated through the membrane at the maximum membrane system's operating pressure. This recovery is normally limited by the osmotic pressure which is directly proportional to the concentrations of soluble compounds. Normally, spirally-wound low pressure or "brackish water" RO membranes are operated at pressures in the range 200–400 lb./sq. inch (psig), whereas spirally-wound "high pressure" or "seawater" RO membranes are operated at up to 1200 psig. Plate and Frame or Disc-Type membranes can be operated at pressures of up to 3000 psig.

On the other hand, the purified water recovery is very frequently limited by formation of inorganic "crystalline" precipitate which deposits on the membrane as the concentration of sparingly soluble compounds (e.g. calcium fluoride, calcium carbonate, silica, etc.) exceeds their maximum solubility in the given solution at the operating temperature. Deposition of this "scale" on the surface of the membranes often leads to irreversible reduction or loss of permeation rate (or loss of permeate flux in gallons/sq. ft of membrane surface/day, gfd) and the need for costly replacement of the membranes. Frequently, the concentration of sparingly soluble compounds (i.e. hardness) in natural water sources such as lakes, rivers and aquifers and in industrial and landfill effluents is sufficiently high to limit the attainable permeate recovery from RO or NF membranes to approximately 60%–80%. Since the TDS of such water sources is typically low, ranging from say 150–500 mg/L (ppm) in lakes and rivers to 500–1500 ppm in the case of groundwater and brackish water aquifers, osmotic pressure is therefore not the permeate recovery limiting factor. As the permeate recovery is increased beyond the range 60–80%, calcium carbonate, calcium fluoride, silica or other sparingly soluble compounds exceed their solubility and precipitate as scale on the membrane surface. The use of acids and antiscalants such as polyacrylates, EDTA, SHMP, etc. will somewhat broaden the recovery range and improve cleanability of the membranes. However, as the concentration of anti-scalants is increased, they become ineffective and in fact they form insoluble compounds with the water hardness cations. The limited effectiveness of these chemical additives means that "the membrane reject stream volume" will be quite high, typically greater than 20–30% of the raw water volume treated, thereby representing a costly disposal problem in many cases.

In other prior art (viz. U.S. Pat. No. 5,501,798), an attempt was made to increase the permeate recovery using a single stage RO process followed by precipitation of scale from the RO concentrate and recycling of MF-treated concentrate after precipitation back to the RO to maximize the recovery. However, while this process represents a substantial improvement over prior art, it is not very economical and its maximum recovery is limited by build-up of hardness in the RO concentrate recycle stream which necessitates a large recycle via chemical precipitation and microfiltration to separate the precipitated solids. This results in relatively high capital cost due to the chemical precipitation system used to precipitate and separate the hardness compounds and the MF membrane system used to separate all suspended solids prior to recycling to the high pressure side of the membranes. Furthermore, high operating costs are also incurred in the prior art (viz. U.S. Pat. No. 5,501,798) since sodium hydroxide or other alkali solutions are used to raise the pH of the membrane concentrate and sulphuric acid or other inorganic acids are subsequently used to neutralize the chemically "softened" concentrate before recycling.

In the present invention, the limitations on the permeate recovery from a semi-permeable membrane (e.g. reverse osmosis, RO or nanofiltration, NF) which were experienced in prior art are completely eliminated while simultaneously reducing the overall cost and rendering the single stage high water recovery process economically viable. This is achieved in the case of small flowrates and moderate to high water hardness by employing a single stage membrane process in which the membrane concentrate is recycled directly to the influent, high-pressure side of the membrane after a simple and cost-effective hardness removal treatment step. In contrast to the costly and complex chemical precipitation and microfiltration treatment of the membrane concentrate in the prior art (viz. U.S. Pat. No. 5,501,798), the hardness removal step in the present invention comprises a simple and yet effective ion exchange softening resin (viz. IX water softener). By continuously removing the hardness cations and other heavy metals (i.e. calcium, magnesium, barium, iron, etc.) from the membrane concentrate and recycling the softened concentrate to the inlet side of the membrane for further purification, high overall permeate recoveries can be achieved without scale formation.

The membrane system can be operated at pressures as high as necessary (e.g. 500 psig–3000 psig) in order to overcome osmotic pressure and achieve the desired permeate recovery, depending on the Influent Water TDS. In this manner, recoveries >95% and even >99% can be achieved while prolonging the useful life of the membrane.

Thus, for example, FIG. 1 provides a schematic illustrating the process of the invention which treats small water flowrates of 5–50 U.S. gpm, containing inorganic contaminants with low to moderate TDS concentration of 100–1000 mg/liter and preferably 200–400 mg/liter and moderate to high hardness in the range 100–1000 mg/liter as CaCO3 and normally 100–200 mg/liter CaCO3. In accordance with this invention, it is possible to achieve permeate recoveries in the range 67%–99.9% without the deposition of inorganic scale on the surface of the membrane. As shown in FIG. 1, the Raw Water or Influent Water 1 is introduced into a suitable Pretreatment Means 2 consisting of a clarifier or gravity settler with or without the use chemical coagulants and/or flocculants or alternatively by using an air flotation device, to be followed by a single media or multi-media filtration device followed by a cartridge filter in the 5–10 micron particle separation range. Alternatively, the Influent Water 1 is pretreated by a suitable nonfouling ultrafiltration or microfiltration membrane such as but not limited to tubular or hollow fiber membranes or any suitable combination of the above pretreatment means which will efficiently separate oil and grease, colloidal iron and other suspended solids and prevent premature fouling and "surface blinding" of the membranes 7 downstream.

By further reference to FIG. 1, the pretreated water 3 is further conditioned by adding a suitable acid 4 such as sulfuric acid, hydrochloric acid or any other suitable inorganic or organic acid in order to control the pH in the range 5–8 and preferably in the range 5.5–6.5, thereby reducing the calcium carbonate scale formation potential. A suitable anti-scalant chemical 5 may be selected from a group of chemicals including polyacrylic acids, metal sequestering agents such as Ethylene Diamine Tetracetic Acid (EDTA) and Sodium Hexa Meta Phosphate (SHMP) and added to the pretreated Influent Water 3 in order to maximize the permeate recovery from the membrane system 7 while preventing scale formation. Furthermore, the pretreated Influent 3 is blended with the softened (i.e. hardness-free) membrane concentrate recycle stream 18, which contains a relatively high concentration of "soluble ions", i.e. sodium, potassium, chloride, sulfate, etc. in order to produce a larger volume of blended, low-hardness and high TDS pretreated and preconditioned stream 6.

The pretreated and preconditioned stream 6 in the embodiment of FIG. 1 is introduced into the high pressure side of the single stage membrane system 7 consisting of a suitable semipermeable membrane selected from a group of spirally wound, hollow fiber, tubular, plate and frame and disc-type nanofiltration (NF) and reverse osmosis (RO) membranes. Purified water permeate 16 containing a much lower concentration of TDS is recovered on the low pressure side of the semi-permeable membranes and the membrane concentrate 12 is removed from the high pressure side of the membranes and subjected to further treatment in order to increase the purified water recovery. The membrane system's operating pressure will be determined by the Influent Water TDS concentration and the desired permeate recovery since these parameters will determine the osmotic pressure exerted by the solution. In general, the higher the initial TDS and/or the higher the desired permeate recovery, the higher the operating pressure. As an example, for an influent TDS of 200 mg/L, an operating pressure in the range 400–500 psig will be required to achieve a permeate recovery of 98–99%, based on the Influent Water volume 1. It will be noted, however, that as the permeate recovery is increased, the purified (i.e. permeate) water quality deteriorates.

The membrane concentrate 12 is sent to an efficient cation exchange softening resin 17, wherein all the hardness due to barium, calcium, magnesium, etc. is removed and replaced with sodium or with hydrogen ions (i.e. acid), thereby providing a "hardness free" softened membrane concentrate 18 for recycle to the influent side of the membrane system 7. By blending the IX-softened membrane concentrate 18 with the pretreated Influent Water 3 in accordance with this invention, it is possible to achieve the desired high water recovery ranging from 67% to 99.9% without forming scale compounds on the surface of the membrane 7 with its attendant problems of permeate flux loss and premature membrane replacement. Since the water TDS to which this embodiment is applied is relatively small, the operating pressure is also relatively low and therefore the economics of this embodiment are favorable.

The IX softening resin 17, can be selected from a group comprising chelating resins made from a polystyrene matrix and substituted with weakly acidic iminodiacetic or aminophosphonic active groups or from a group consisting of Weak Acid Cation Exchangers made from polyacrylic resins or other suitable polymers with carboxylic acid functional groups. Alternatively, the "softening resin" can be selected from a group consisting of Strong Acid Cation Exchange resins with a polystyrene matrix and substituted sulphonic acid active groups.

The chelating resins have very high selectivity for calcium and magnesium ions even in the presence of high concentrations of brine (i.e. sodium chloride), thereby enabling the selective and complete removal of calcium and other divalent ions and heavy metals from the membrane concentrate.

The Weak Acid Cation Exchangers will remove temporary hardness linked to bicarbonate alkalinity using a process known as dealkalization, wherein the calcium and magnesium ions are replaced with hydrogen ions, thereby lowering the pH and converting the bicarbonate to carbon dioxide. This process will result in partial softening which is also suitable provided a sufficiently large recycle stream 18 is used. This method has the advantage of lower acid consumption for regeneration than the strong acid cation exchange resin below, and will result in a reduced concentrate TDS as a result of carbonate removal.

Alternatively, when softening with a strong acid cation exchange resin, hardness metals can be removed at very high efficiencies, depending on the relative concentration of sodium ions in the membrane concentrate. In the strong acid cation exchange resins (sodium form), the hardness metals are replaced by sodium ions which are very soluble and offer zero scale potential. The ion exchange resin is regenerated with sodium chloride at hardness breakthrough. By using an efficient IX resin and a counter-current regeneration technique, the quantity of sodium chloride used in regeneration of the resin is minimized (e.g. only 110% of stoichiometric value).

By continuously removing the hardness cations and other heavy metals (i.e. calcium, magnesium, barium, iron, etc.) from the membrane concentrate 12 and, recycling a sufficient volume of the softened membrane concentrate 18, to the inlet side of the membrane for further purification, high overall permeate recoveries can be achieved and scale formation can be prevented. Recycling of the softened membrane concentrate 18, will achieve the following two objectives:

1. it will reduce the overall hardness ion concentrations in the blended influent (stream 6) to the membrane system 7, and
2. it will increase the solubility of all sparingly soluble salts in the blended Influent stream 6 as a result of increasing the overall ionic strength of the solution.

These features allow attainment of much higher purified water recoveries than would be normally achievable by the prior art, in an economical manner and without attendant scale formation and premature membrane failure and costly replacement that are associated with the prior art. Depending on the nature of the water treatment application, i.e. whether high purity is required or whether it is merely desired to remove hardness, the single stage membrane can be an RO or NF membrane, respectively. Note that while these membranes are used in prior processes, the key features of this invention are the high purified water recoveries which are achievable in an economical manner.

Therefore, in accordance with the present invention, the single stage membrane system 7 provides a purified water stream 16 on the low pressure (permeate) side of the membrane, which is low in hardness and, when RO membranes are used, the purified water stream 16 will also have low concentrations of all other soluble ions such as sodium, chloride, etc. and the water can thus be used as feed to cooling towers, boilers or other high purity water applications after suitable polishing treatment with a second pass RO and/or mixed bed or exchange resins.

A small membrane reject stream 13 is removed from the membrane concentrate 12 under flow control in order to control the concentration of soluble inorganic compounds and hence the osmotic pressure. For example, if the desired overall process permeate recovery is 99%, then only 1% of the Influent Water stream 1 volume must be removed under flow control via reject stream 13.

Figure 2:
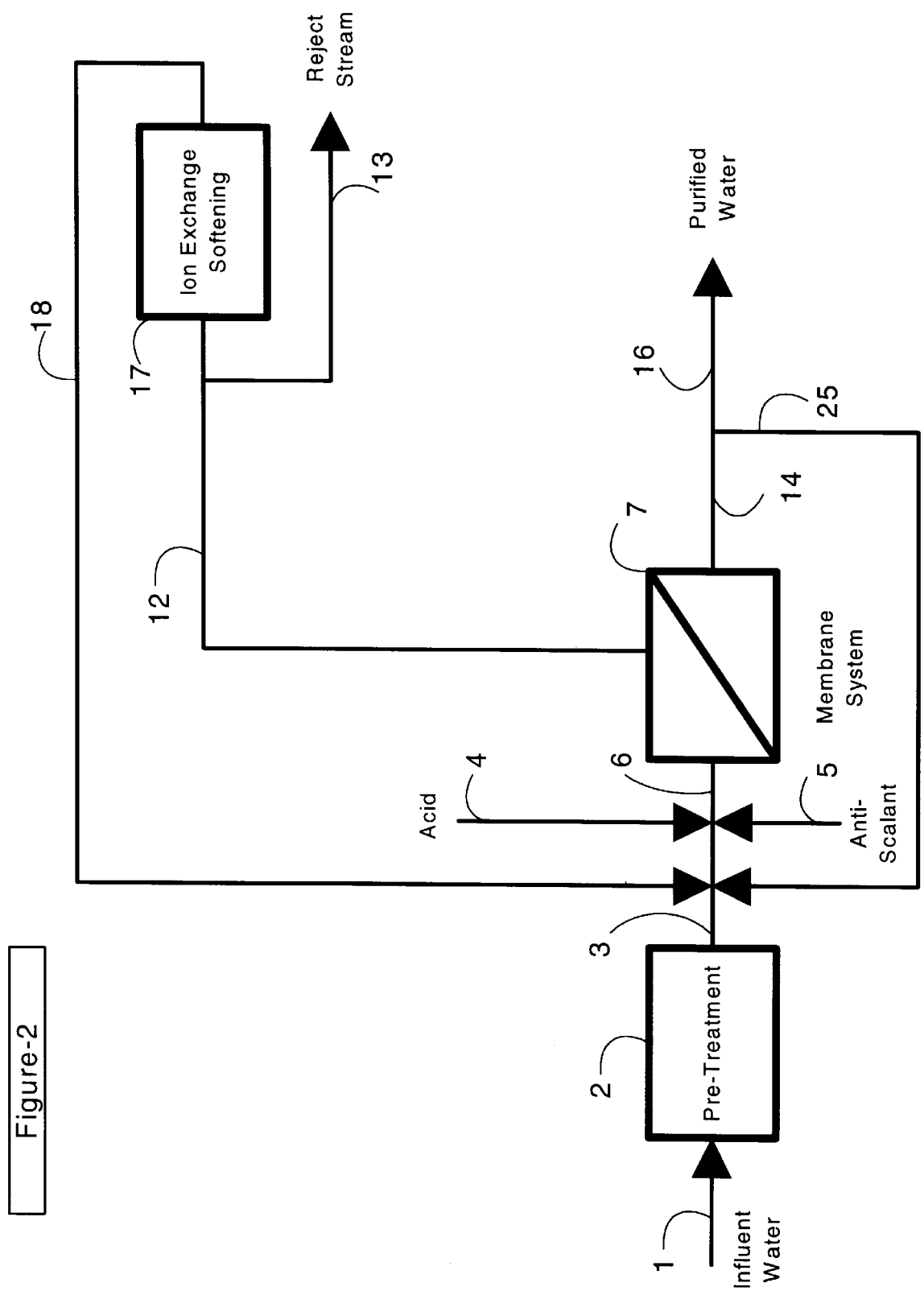
FIG. 2 is a schematic representation of yet another economical enhanced recovery single stage membrane process for the purification of relatively small volumes of water containing low to moderate TDS and moderate to high hardness where a relatively high purity of treated water 16 is required with a minimum reject volume 13. In essence, this process is similar to the process depicted in FIG. 1 except for recycling a large fraction 25 of membrane permeate 14 to the influent side of the membrane 7, thus enabling further cost-effective purification of the Influent Water 1, using the same "single stage" membrane system 7.

The best mode of this invention is represented schematically in FIG. 2 which illustrates another economical high recovery single stage membrane process for the purification of small volumes of water containing relatively low TDS and low to moderate hardness. In addition to the need for a minimum volume of reject stream 13, it is also desired to provide a membrane permeate 16 with relatively high purity.

In accordance with this embodiment of the invention, the Influent Water 1 is pretreated by suitable pre-treatment means 2 as described earlier, and the said pretreated water is blended with a softened high TDS membrane concentrate recycle stream 18 as well as a substantial volume of the recycled membrane permeate stream 25, preconditioned with acid 4 and anti-scalant 5 and then introduced into the single stage membrane system 7. The process of this invention is capable of achieving purified water recoveries in the range 67%–99.9% and more preferably 95%–99.9%, depending on the Influent Water TDS, desired permeate quality and operating pressure. Based on a relatively low Influent Water TDS of 200 mg/L, it would be possible to achieve permeate recoveries in the range 98%–99% at a pressure in the range 400–500 psig without precipitation of scale on the membrane surface. This is achieved as a result of removal of hardness cations on the IX softening resin 17 and blending of the recycled softened membrane concentrate 18 with the Influent Water 1. The higher the hardness ion concentration in the Influent Water 1, the larger the softened membrane concentrate 18 required to be recycled in order to prevent scale formation on the membrane at the high recoveries targeted. A typical concentrate recycle stream 18 volume would be in the range 20%–40% based on the Influent Water stream 1 flowrate.

In accordance with this embodiment, a large volume fraction 25 of the membrane permeate 14 is recycled to the influent side of the membranes 7 and blended with the pre-treated influent water 3 in order to achieve further purification and improve the quality of the final purified water stream 16. The higher the volume of the permeate 25 recycled to the influent side of the membrane 7 the better the quality (i.e. the higher the purity) of the purified water stream 16. A typical permeate recycle volume will be in the range 50%–100% of the Influent Water 1 volume and more preferably 90%–100% of the Influent Water volume. In this manner, the total ion concentration in the membrane permeate can be reduced to <1% of the Influent Water TDS. As before, a small membrane reject stream 13 is removed from the membrane concentrate 12 under flow control in order to control the concentration of soluble inorganic compounds.

Figure 3:
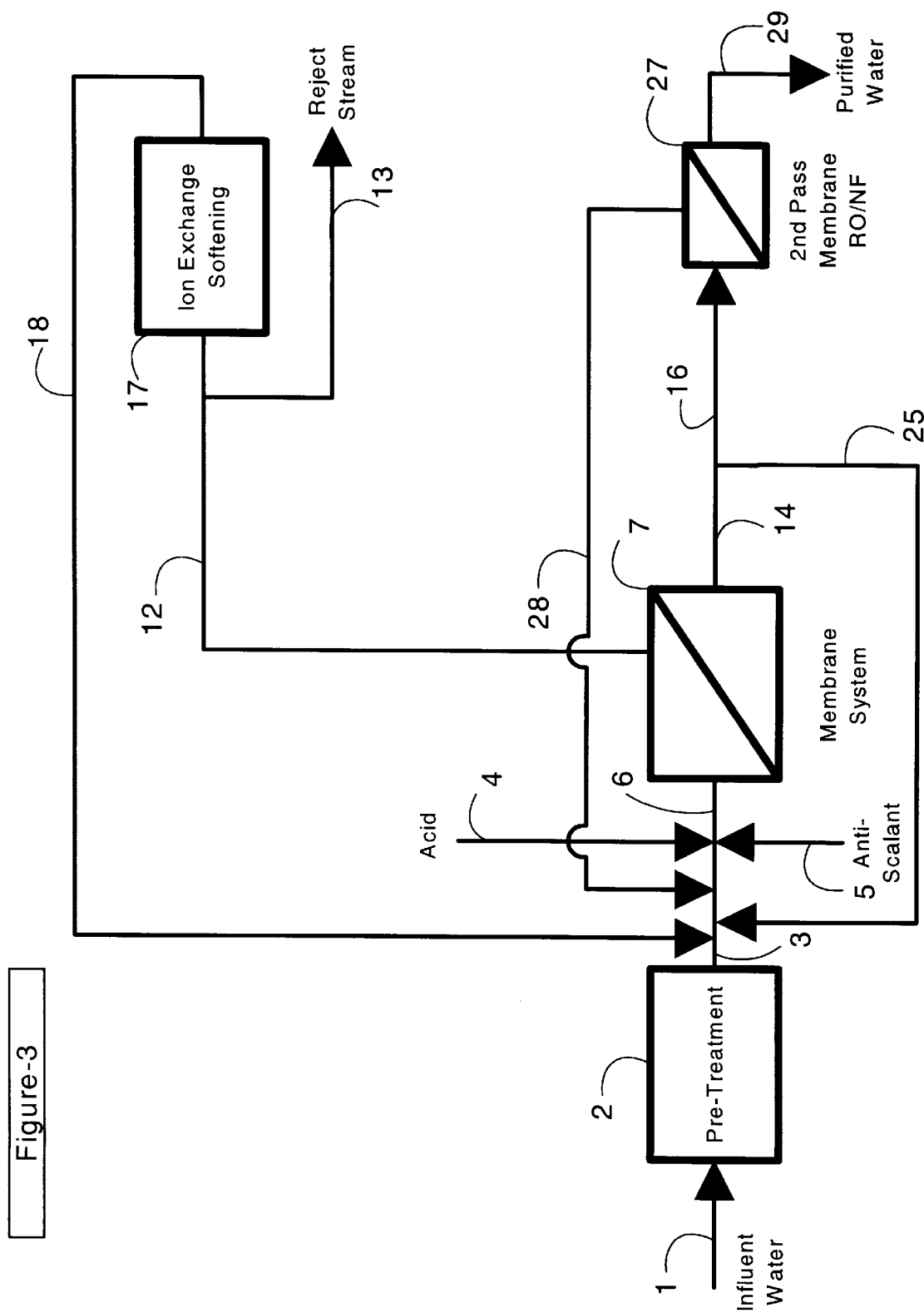
FIG. 3 is a schematic representation of yet another economical enhanced recovery single stage membrane process for the production of very high purity water 29 which involves recycling of the membrane concentrate 12 via an IX softening resin 17 in order to prevent scale formation on the membrane 7 and recycling membrane permeate 25 to improve the water quality, as shown in FIG. 2. In this case, however, a large fraction 16 of the membrane permeate 14 is purified further by using a second pass membrane system 27, in order to provide very high purity water 29.

Yet another embodiment of this invention is represented schematically in FIG. 3 which illustrates another economical high recovery single stage membrane process for the purification of small volumes of water containing relatively low TDS and low to moderate hardness. In addition to the need for a minimum volume of reject stream 13, it is also desired to provide a membrane permeate with very high purity, as required by the pharmaceutical industry. This embodiment of the invention, as represented in FIG. 3, provides an improvement over the embodiment illustrated in FIG. 2 by introducing the membrane permeate 16 into a second pass semi-permeable membrane purification step 27. This second pass membrane step 27 will preferably consist of reverse osmosis membranes or "tight" nanofiltration membranes. In this manner, this embodiment of the invention will provide a purified water stream 29 with an electrical resistivity >2 mega ohms (i.e. electrical conductivity <0.5 µS/cm) at a high overall system recovery in the range 90%–99%, depending on the influent water TDS. In order to minimize the reject stream volume 13, the second pass membrane concentrate 28, which contains relatively low TDS and very low hardness, is recycled to the high pressure side of the first pass membrane system 7 where it is purified further resulting in increased overall process permeate recovery. As before, the TDS and osmotic pressure of the first pass membrane concentrate stream 12 are controlled by removing and disposing of a small volume of reject stream 13 under flow control.

And yet another embodiment of this invention is represented schematically in FIG. 4 which illustrates another economical high recovery single stage membrane process for the purification of relatively small volumes of water containing relatively low TDS and low to moderate hardness. In addition to the need for a minimum volume of reject stream 13, it is also desired to provide a membrane permeate with extremely high purity as required by the electronics industry. In this embodiment of the present invention, represented in FIG, 4, the very high purity permeate 29 obtained from the second pass membrane system 27 as described in the embodiment of FIG. 3, is treated further with a mixed bed ion exchange "polishing" system 30. This IX polishing system will further reduce the electrical conductivity of the permeate and produce a purified water stream 31 having an electrical resistivity >18 mega ohm, which is the quality required by the electronics industry in the manufacture of semiconductor wafers. By using the above-described single stage two pass membrane process, this embodiment of the invention therefore produces extremely high quality water at very high permeate recoveries without the attendant problems of scaling and loss of useful life of the membrane.

While the invention has been described in terms of preferred embodiments, the claims appended hereto are intended to encompass other embodiments which fall within the spirit of the invention.

What is claimed is:

1. An improved high recovery single stage single pass membrane process for the economical operation of semi-permeable reverse osmosis (RO) membranes which are used to purify low flowrates of water containing low concentrations of soluble and sparingly soluble inorganic compounds and achieve high recoveries of purified water in the range 95%–99.9% of the Influent Water without precipitation of sparingly soluble inorganic scale compounds on the surface of the membrane, comprising:

(a) pretreating the Influent Water using a suitable pretreatment means to separate all suspended solids, oil and grease and iron and produce pretreated water;

(b) blending said pretreated water containing soluble and sparingly soluble inorganic compounds with a large, softened, membrane concentrate recycle stream containing a high concentration of Total Dissolved Solids (TDS) to produce a blended feed stream;

(c) pre-conditioning said blended feed stream by adding acid and antiscalant in order to produce a preconditioned blended feed stream having a low scale forming tendency;

(d) introducing said preconditioned blended feed stream into the high pressure side of the single stage single pass RO membranes;

(e) pressurizing said preconditioned blended feed stream on said high pressure side of said single stage single pass RO membranes to produce purified water permeate on the low pressure side of said single stage single pass RO membranes substantially free of said inorganic compounds;

(f) removing a membrane concentrate stream containing pre-concentrated soluble and sparingly soluble inorganic compounds from said high pressure side of said single stage single pass RO membranes without precipitation of said pre-concentrated sparingly soluble inorganic compounds on said single stage single pass RO membranes;

(g) recovering said purified water permeate on said low pressure side of said single stage single pass RO membranes at a rate in the range 95%–99% of the rate of introducing said Influent Water containing said soluble and sparingly soluble inorganic compounds to said high pressure side of said single stage single pass RO membranes;

(h) introducing said RO membrane concentrate seam into an ion exchange water softer resin which separates and retains the hardness due to said sparingly soluble inorganic compounds to provide a softened, high TDS RO membrane concentrate stream;

(i) recycling said softened, high TDS RO membrane concentrate stream at a flow of 40%–60% of the flow rate of the Influent Water and blending it with said pretreated water to produce said blended feed stream which is preconditioned and introduced into said high pressure side of said single stage single pass RO membranes;

(j) removing a small RO membrane reject stream from said RO membrane concentrate stream at a rate in the range 0.1% to 5% of the rate of introducing said Influent Water to said high recovery single stage single pass membrane process in order to control the concentration of said soluble inorganic compounds and hence the osmotic pressure;

(k) disposing of said small RO membrane reject steam to drain or via other suitable waste disposal means.

2. The high recovery single stage single pass membrane process in accordance with claim 1 in which said membranes are nanofiltration membranes (NF).

3. The high recovery single stage single pass membrane process in accordance with claim 1 or 2 in which said Influent Water flowrate is in the range 1–500 U.S. gallons/minute (gpm).

4. The high recovery single stage single pass membrane process in accordance with claim 1 or 2 in which said Influent Water flowrate is in the range 5–50 gpm.

5. The high recovery single stage single pass membrane process in accordance with claim 1 or 2 in which said single stage single pass RO membranes or said single stage single pass NF membranes are operated at a pressure in the range 100–3000 lb/square inch (psig).

6. The high recovery single stage single pass membrane process in accordance with claim 1 or 2 in which said single stage single pass RO membranes or said single stage single pass NF membranes are operated at a pressure in the range 20–500 psig.

7. The high recovery single stage single pass membrane process in accordance with claim 1 or 2 in which recycling of said softened, high TDS RO or NF membrane concentrate, respectively, to said high pressure side of said single stage single pass RO or NF membranes, respectively, is conducted at a rate in the range 10%–100% of the rate of introducing said Influent Water to said high recovery single stage single pass membrane process.

8. The high recovery singe stage single pass membrane process in accordance with claim 1 or 2 in which said purified water permeate is removed from said single stage single pass RO or NF membranes, respectively, at a rate in the range 95%–99.9% of the rate of introducing said Influent Water to said high recovery single stage single pass membrane process.

9. The high recovery single stage single pass membrane process in accordance with claim 1 or 2 in which said RO or NF membrane reject stream, respectively, is removed from said RO or NF membrane concentrate stream, respectively, and disposed of at a rate in the range 0.1%–5% of the rate of introducing said Influent Water to said high recovery single stage single pass membrane process.

10. The high recovery single stage single pass membrane process in accordance with claim 1 or 2 in which said acid is selected from a group of common inorganic and organic acids consisting of hydrochloric acid, sulfuric acid, phosphoric acid, acetic acid and citric acid.

11. The high recovery single stage single pass membrane process in accordance with claim 1 or 2 in which said antiscalant is selected from a group consisting of polyacrylic acid, EDTA and sodium hexametaphosphate.

12. The high recovery single stage single pass membrane process in accordance with claim 1 or 2 in which said ion exchange water softening resin is selected from a group consisting of chelating resins, weak acid cation exchange resins, strong acid cation exchange resins in their sodium form and a combination of fixed bed and continuous cation exchange systems.

13. The high recovery single stage single pass membrane process in accordance with claim 1 in which a fraction of said purified water permeate from said low pressure side of said single stage single pass RO membranes is recycled to said high pressure side of said single stage single pass RO membranes at a rate in the range 10%–100% of the rate of introducing said Influent Water to said high recovery single stage single pass membrane process, in order to produce high purity water.

14. The high recovery single stage single pass membrane process in accordance with claim 1 in which a fraction of said purified water permeate from said low pressure side of said single stage single pass RO membranes is recycled to said high pressure side of said single stage single pass RO membranes at a rate in the range 50%–100% of the rate of introducing said Influent Water to said high recovery single stage single pass membrane process, in order to produce high purity water.

15. An improved high recovery single stage double pass membrane process for the economical operation of semipermeable reverse, osmosis (RO) membranes which are used to purify low flowrates of water containing low concentrations of soluble and sparingly soluble inorganic compounds and achieve high recoveries of very high purity water in the range 67%–99.9% of the Influent Water without precipitation of sparingly soluble inorganic scale compounds on the surface of the membrane, comprising:

(a) pretreating the Influent Water using a suitable pretreatment means to separate all suspended solids, oil and grease and iron and produce pretreated water;

(b) blending said pretreated water, containing soluble and sparingly soluble inorganic compounds, with a large, softened, membrane concentrate recycle stream containing a high concentration of Total Dissolved Solids (TDS), with a recycled purified water permeate from the low pressure side of the first pass membranes of said single stage membrane processed and with a relatively low TDS second pass RO membrane concentrate to produce a blended feed stream;

(c) preconditioning said blended feed stream by adding acid and antisicalant in order to produce a preconditioned blended feed stream having a low scale forming tendency;

(d) introducing said preconditioned blended feed stream into the high pressure side of the first pass membranes of said single stage double pass membrane process;

(e) pressurizing said preconditioned blended feed stream on said high pressure side of said first pass membranes of said single stage double pass membrane process to a pressure in the range 100–3000 lb/square inch (psig), to produce purified water permeate on the low pressure side of said first pass membranes substantially free of said inorganic compounds;

(f) removing an RO membrane concentrate stream containing pre-concentrated soluble and sparingly soluble inorganic compounds from said high pressure side of said first pass membranes of said single stage double pass membrane process without precipitation of said pre-concentrated sparingly soluble inorganic compounds on said first pass membranes;

(g) recovering said purified water permeate on said low pressure side of said first pass membranes at a rate in the range 67%–99.9% of the rate of introducing said Influent Water containing said soluble and sparingly soluble inorganic compounds to said high pressure side of said first pass membranes of said single stage double pass membrane process;

(h) introducing said RO membrane concentrate stream into an ion exchange water softening resin selected from a group consisting of chelating resins, weak acid cation exchange resins, strong acid cation exchange resins in their sodium form and a combination of fixed bed and continuous cation exchange systems which separate and retain the hardness due to said sparingly soluble inorganic compounds to provide a softened, high TDS RO membrane concentrate stream;

(i) recycling said softened, high TDS RO membrane concentrate stream and blending it with said pretreated water, said recycled purified water permeate and said relatively low TDS second pass RO membrane concentrate to produce said blended feed stream which is preconditioned and introduced into said high pressure side of said first pass membranes of said single stage double pass membrane process;

(j) removing a small RO membrane reject stream from said RO membrane concentrate stream at a rate in the range 0.1% to 33% of the rate of introducing said Influent Water to said high recovery single stage double pass membrane process in order to control the concentration of said soluble inorganic compound and hence the osmotic pressure;

(k) disposing of said small RO membrane reject stream to drain or via other suitable waste disposal means;

(l) recycling a fraction of said purified water permeate from said low pressure side of said first pass membranes of said single stage double pass membrane process to said high pressure side of said first pass membranes at a rate in the range 10%–100% of the rate of introducing said Influent Water to said high recovery single stage double pass membrane process, in order to produce high purity water on the low pressure side of said first pass membranes;

(m) adjusting the pH of said high purity water to the neutral range 6–8 to produce pH-adjusted high purity water;

(n) introducing said pH-adjusted high purity water into the high pressure side of second pass RO membranes of said single stage double pass membrane process;

(o) pressurizing said pH-adjusted high purity water on the high pressure side of said second pass RO membranes to provide a very high purity water permeate on the low pressure side and to provide a relatively low TDS second pass RO membrane concentrate on the high pressure side of said second pass RO membranes;

(p) removing said relatively low TDS second pass RO membrane concentrate from the high pressure side of said second pass RO membranes at a rate sufficiently high to ensure very high purity of said very high purity water permeate;

(q) recovering said very high purity water permeate having an electrical resistivity >2 mega ohms from said low pressure side of said second pass RO membranes at a rate in the range 50%–90% of the rate of introducing said pH-adjusted high purity water into said high pressure side of said second pass RO membranes;

(r) recycling said relatively low TDS second pass RO membrane concentrate from said high pressure side of said second pass RO membranes to said high pressure side of said first pass membranes of said single stage double pass membrane process to achieve further purification and further increase the recovery of said very high purity water permeate.

16. The high recovery single stage double pass membrane process in accordance with claim 15 in which said very high purity water permeate is purified further to provide extra high purity water by introducing said very high purity water permeate into a mixed bed ion exchange (IX) polishing resin wherein trace soluble inorganic compounds measured as residual electrical conductivity in said very high purity water permeate are completely removed by said mixed bed IX polishing resin in order to economically produce extra high purity water having an electrical resistivity >18 mega ohms at high permeate recoveries without precipitation of scale compounds on the surface of said first pass membranes and said second pass RO membranes of said high recovery single stage double pass membrane process.

* * * * *